(12) United States Patent
Cao

(10) Patent No.: US 11,455,293 B2
(45) Date of Patent: Sep. 27, 2022

(54) COUNTING METHOD, COUNTER AND STORAGE MEDIUM

(71) Applicant: Ping An Technology (Shenzhen) Co., Ltd., Guangdong (CN)

(72) Inventor: Huirong Cao, Guangdong (CN)

(73) Assignee: Ping An Technology (Shenzhen) Co., Ltd., Shenzhen (CN)

(*) Notice: Subject to any disclaimer, the term of this patent is extended or adjusted under 35 U.S.C. 154(b) by 475 days.

(21) Appl. No.: 16/495,839

(22) PCT Filed: Apr. 9, 2018

(86) PCT No.: PCT/CN2018/082233
§ 371 (c)(1),
(2) Date: Sep. 20, 2019

(87) PCT Pub. No.: WO2018/188542
PCT Pub. Date: Oct. 18, 2018

(65) Prior Publication Data
US 2020/0133936 A1 Apr. 30, 2020

(30) Foreign Application Priority Data
Apr. 10, 2017 (CN) .......................... 201710229564.6

(51) Int. Cl.
*G06F 16/00* (2019.01)
*G06F 16/23* (2019.01)
(Continued)

(52) U.S. Cl.
CPC ........ *G06F 16/2365* (2019.01); *G06F 16/217* (2019.01); *G06F 16/2379* (2019.01); *H04L 43/0882* (2013.01); *H04L 43/16* (2013.01)

(58) Field of Classification Search
CPC ............... G06F 16/217; G06F 16/2365; G06F 16/2379; H04L 43/08; H04L 43/0882;
(Continued)

(56) References Cited

U.S. PATENT DOCUMENTS

| 9,929,970 | B1* | 3/2018 | Matthews | ............... H04L 43/16 |
| 2017/0201574 | A1* | 7/2017 | Luo | .......................... H04L 47/70 |
| 2019/0164443 | A1* | 5/2019 | Reed | ........................ G09B 5/06 |

FOREIGN PATENT DOCUMENTS

| CN | 105024933 A | 11/2015 |
| CN | 105095423 A | 11/2015 |

\* cited by examiner

*Primary Examiner* — Dinku W Gebresenbet

(57) ABSTRACT

A counting method, a counter and a storage medium, wherein the method includes: detecting whether a count application source exists; obtaining a quantity of counts caused by a current count application source in unit time and server-related parameters, if a count application source exists; determining a mode in which the current count application source updates the database according to the quantity of counts or the server-related parameters, the mode including a real-time mode and a high-performance mode; accumulating the counts caused by the current count application source running in the server to obtain an accumulated value, if the current count application source updates the database in the high-performance mode; and updating the accumulated value of the current count application source to the database according to a preset frequency.

15 Claims, 6 Drawing Sheets

(51) Int. Cl.
*G06F 16/21* (2019.01)
*H04L 43/0882* (2022.01)
*H04L 43/16* (2022.01)

(58) Field of Classification Search
CPC ....... H04L 43/16; H04L 43/50; H04L 41/082; H04L 43/0876
See application file for complete search history.

COUNTING METHOD, COUNTER AND STORAGE MEDIUM

The present application has been filed with foreign priority for a patent application with Patent Application No. 201710229564.6 and the title "Counting method and counter" to China Patent Office on Apr. 10, 2017, and the whole content of the invention is cited and combined into this patent application.

FIELD OF INVENTION

The present application relates to the technical field of data processing, in particular to a counting method, a counter and a storage medium.

BACKGROUND OF INVENTION

When a preset platform (server) is invoked by multiple other platforms, the multiple other platforms (multiple count application sources) run on the preset platform to generate counts. Currently, the database counting or third-party system counting is commonly used. The database counting produces frequent update operations and brings a lot of load to the database; and the third-party system counting needs to rely on third-party systems such as Redis, mongoDB or Zookeeper, which increases the development and operation costs.

SUMMARY OF THE INVENTION

The embodiments of the present application provide a counting method, a counter and a storage medium, which could dynamically adjust the mode of count application source to update the database, so as to reduce the interaction frequency with the database, and reduce the pressure of the database while ensuring the accuracy of counting.

In a first aspect, the present application provides a counting method, which comprises: detecting whether a count application source exists; obtaining a quantity of counts caused by a current count application source in unit time and server-related parameters, if the count application source exists, the server-related parameters comprising at least one of a utilization rate of CPU, a utilization rate of memory and a quantity of current network connections; determining a mode in which the current count application source updates the database according to the quantity of counts or the server-related parameters, the mode comprising a real-time mode and a high-performance mode; accumulating the counts caused by the current count application source running in the server to obtain an accumulated value, if the current count application source updates the database in the high-performance mode; and updating the accumulated value of the current count application source to the database according to a preset frequency.

In a second aspect, the present application further provides a counter, which comprises: a detecting unit, for detecting whether a count application source exists; a obtaining unit, for obtaining a quantity of counts caused by a current count application source in unit time and server-related parameters, if a count application source exists, the server-related parameters comprising at least one of a utilization rate of CPU, a utilization rate of memory and a quantity of current network connections; a determining unit, for determining a mode in which the current count application source updates the database according to the quantity of counts or the server-related parameters, the mode comprising a real-time mode and a high-performance mode; an accumulating unit, for accumulating the counts caused by the current count application source running in the server to obtain an accumulated value, if the current count application source updates the database in the high-performance mode; and an updating unit, for updating the accumulated value of the current count application source to the database according to a preset frequency.

In a third aspect, the present application further provides another counter, which comprise a memory and a processor coupled to the memory; wherein
the memory is provided for storing program data; and the processor is provided for calling the program data stored in the memory so as to execute the counting method according to the above first aspect.

In a fourth aspect, the present application further provides a computer-readable storage medium, which is provided for storing one or more programs, wherein the one or more programs could be executed by one or more processors, to perform the counting method according to the above first aspect.

The embodiments of the present application could dynamically adjust the mode of count application source to update the database, to reduce the interaction frequency with the database and reduce the pressure of the database while ensuring the accuracy of counting. In addition, in the case that the count application source updates database in a high-performance mode, the database is updated at the preset frequency to achieve a balance between database performance and count accuracy.

BRIEF DESCRIPTION OF THE DRAWINGS

In order to more clearly illustrate the technical solutions of the embodiments of the present application, the drawings needed to be used in the description of the embodiments will be briefly described below, and obviously, the drawings in the following description are some embodiments of the present application, and for person skilled in the art, other drawings could be obtained according to these drawings without any creative work.

DESCRIPTION OF THE EMBODIMENTS

The technical solutions in the embodiments of the present application are clearly and completely described in the following with reference to the accompanying drawings in the embodiments of the present application, obviously, the described embodiments are a part of the embodiments of the present application, and not all of the embodiments. All other embodiments obtained by person skilled in the art based on the embodiments of the present application without creative work fall into the protection scope of the present application.

It should be understood that, when used in the present description and the appended claims, the terms "comprising" and "including" refer to the presence of described features, integers, steps, operations, elements, and/or components, but don't exclude the presence or addition of one or more of other features, integers, steps, operations, elements, components, and/or collections thereof. It should be further understood that, the term "and/or" used in the description of the present application and the appended claims means any combination and all possible combinations of one or more of the associated listed items, and comprises these combinations.

Figure 1:
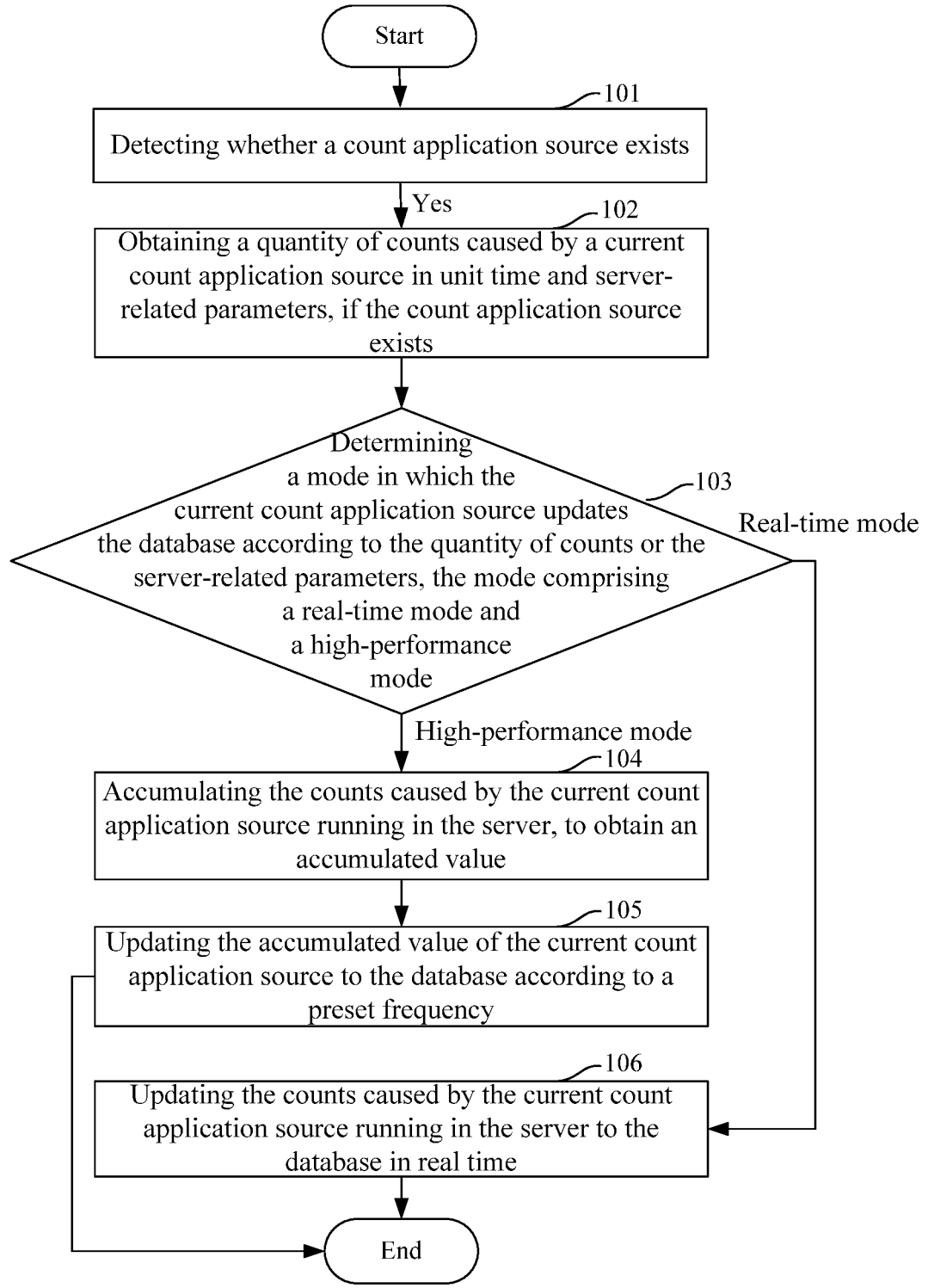
FIG. 1 is a schematic flow chart of a counting method in accordance with an embodiment of the present application.

FIG. 1 is a schematic flow chart of a counting method in accordance with an embodiment of the present application. The method includes the following steps S101-S106.

S101: detecting whether a count application source exists. Specifically, a connection request can be used to detect whether a count application source exists. For example, detect whether the IP address of the connection request matches with the IP address of the pre-stored count application source and determine that the count application source is exists if it matches. Wherein, the connection request of the current count application source is sent to a server. The number of the current count application sources is at least one. Understandably, one or more count application sources could be detected.

S102: obtaining a quantity of counts caused by the current count application source in unit time and server-related parameters, if the count application source exists. Wherein, the server-related parameters include at least one of a utilization rate of CPU, a utilization rate of memory and a quantity of current network connections. The unit time is not just unit time, it also can be a period of time, such as one hour, etc.

S103: determining a mode in which the current count application source updates the database according to the quantity of counts in unit time or the server-related parameters. The mode includes a real-time mode and a high-performance mode. Wherein, the high-performance mode is a non-real-time mode, that is, all other modes except of the real-time mode. Execute S104 if it is the high-performance mode and execute S106 if it is the real-time mode.

Figure 2:
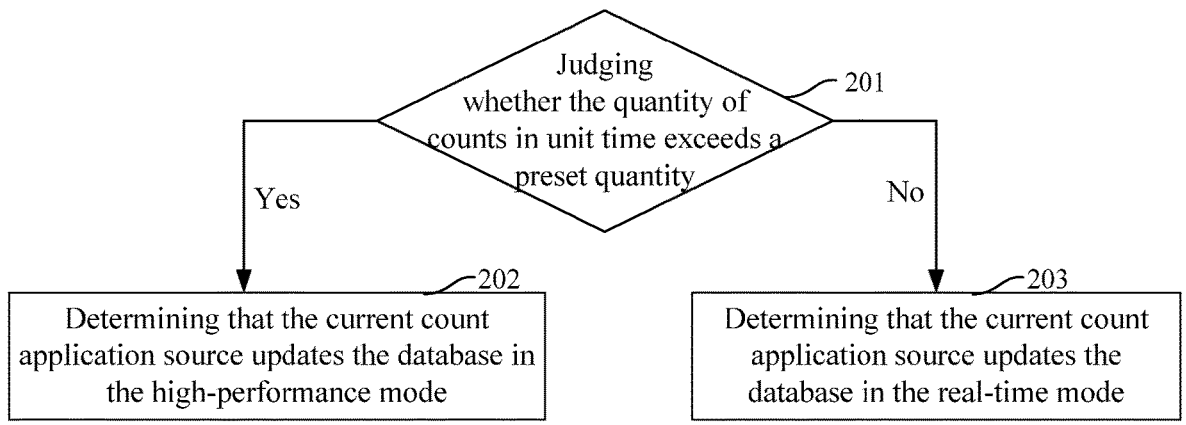
FIG. 2 is a schematic flow chart of sub-steps of a counting method in accordance with an embodiment of the present application.

Preferably, the mode in which the current count application source updates the database can be determined according to the quantity of counts in unit time, specifically, S103 includes S201-S203. As shown in FIG. 2, S201: judging whether the quantity of counts in unit time exceeds a preset quantity; S202: determining that the current count application source updates the database in a high-performance mode, if the quantity of counts in unit time exceeds the preset quantity; and S203: determining that the current count application source updates the database in a real-time mode, if the quantity of counts in unit time is less than or equal to the preset quantity. It should be understood that it could update the database in real time if the quantity of counts in unit time is relatively small; and it needs to update the database in a high-performance mode if the quantity of counts in unit time is relatively large. The mode of updating database of the current count application source can be adjusted dynamically, thereby reducing the interaction frequency between server and database while ensuring the accuracy of count and reducing the pressure of the server and database.

Figure 3:
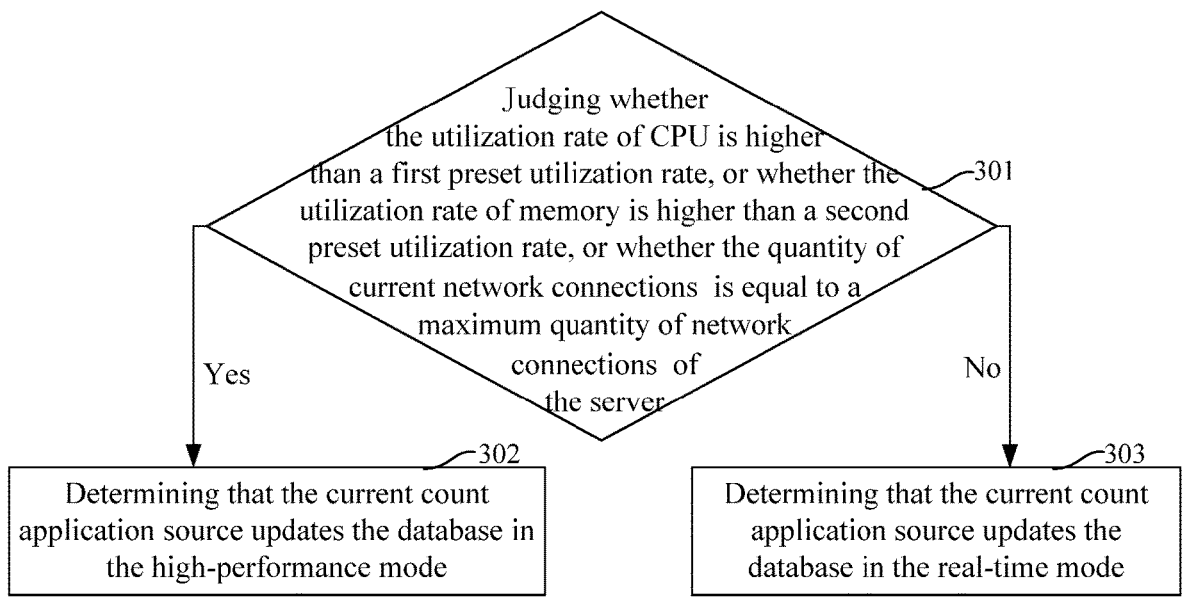
FIG. 3 is another schematic flow chart of sub-steps of a counting method in accordance with an embodiment of the present application.

In other embodiments, the mode in which the current count application source updates the database can be determined according to the server-related parameters, specifically, S103 includes S301-S303. As shown in FIG. 3, S301: judging whether the utilization rate of CPU is higher than a first preset utilization rate, or whether the utilization rate of memory is higher than a second preset utilization rate, or whether the quantity of current network connections is equal to a maximum quantity of network connections of the server. Execute S302 if yes, or else execute S303. S302: determining that the current count application source updates the database in a high-performance mode. S303: determining that the current count application source updates the database in a real-time mode. Preferably, the first preset utilization rate is 30% and the second preset utilization rate is 90%. Understandably, when the utilization rate of CPU is higher than 30%, or the utilization rate of memory is higher than 90%, or the quantity of current network connections is equal to a maximum quantity of network connections of the server, it means that the server already has a lot of work to deal with. If the mode of updating the database is a real-time mode, the server will have more work to deal with, it will occupy more CPU or memory, will increase the pressure on the server, and will increase the pressure on the database. Therefore, when the utilization rate of CPU is higher than the first preset utilization rate, or the memory utilization rate is higher than the second preset utilization rate, or the quantity of current network connections is equal to the maximum quantity of network connections of the server, the current count application source updates the database in a high-performance mode; otherwise, the database is updated in a real-time mode. According to the embodiment shown in FIG. 3, the mode of updating database of the current count application source can be adjusted dynamically, thereby reducing the interaction frequency between server and database while ensuring the accuracy of count, reducing the pressure of the server and database and improving the performance of server.

S104: accumulating counts caused by the current count application source running in the server, to obtain an accumulated value. Specifically, the accumulated value can be obtained by accumulating the counts caused by the current count application source running in the server over a period of time. In this case, the accumulated value will be cleared. The accumulated value also can be obtained by accumulating all the counts caused by the current count application source running in the server.

S105: updating the accumulated value of the current count application source to the database according to a preset frequency. Wherein, if the accumulated value is obtained by accumulating the counts generated by the running of the count application source over a period of time (the time corresponding to the preset frequency), the accumulated value of the count application source will be incremented to the database, and then the accumulated value will be cleared to zero. If the accumulated value is obtained by accumulating all the counts generated by the running of the count application source, an incremental value from the accumulated value of the current count application source is updated to the database at a preset frequency. The preset frequency is related to the quantity of counts of the current count application source in unit time or the server-related parameters. Preferably, the initial value of the preset frequency is 1 minute. End the process after the step S105 is completed.

Figure 4:
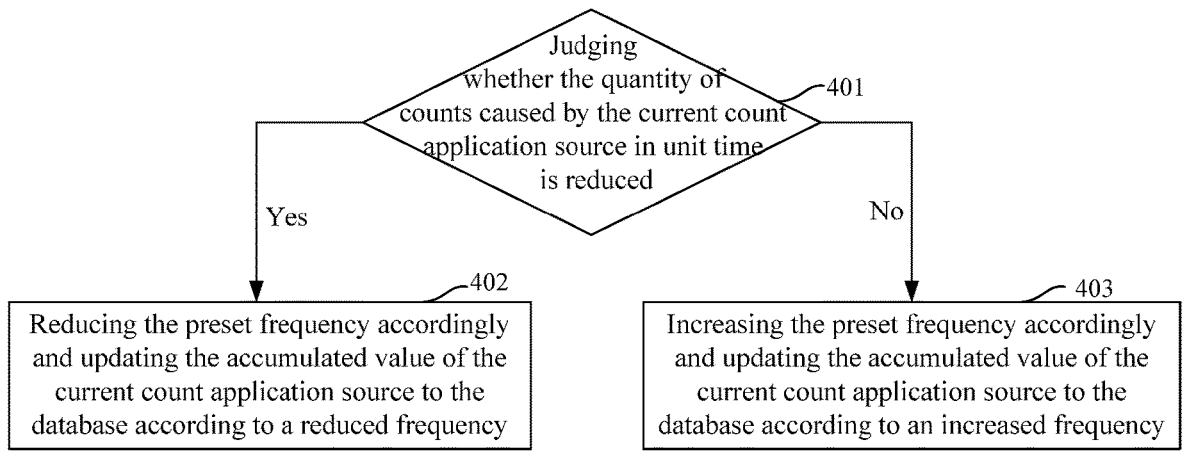
FIG. 4 is another schematic flow chart of sub-steps of a counting method in accordance with an embodiment of the present application.

Specifically, as shown in FIG. 4, S105 includes S401-S403. S401: judging whether the quantity of counts of the current count application source in unit time is reduced. Execute S401 if it is reduced, otherwise execute S403. S402: reducing the preset frequency accordingly and updating the accumulated value of the current count application source to the database according to a reduced frequency. S403: increasing the preset frequency accordingly and updating the accumulated value of the current count application source to the database according to an increased frequency. Understandably, in the high-performance mode, if the quantity of counts of the current count application source in unit time is reduced, the preset frequency will be reduced accordingly, that is, the accumulated value of the current count application source can be updated to the database over a longer period of time; and if the quantity of counts of the current count application source in unit time is increased, the preset frequency will be increased accordingly so that the accumulate value will be updated to the database in time. According to the embodiment of the present application, the frequency of the current count application source updating database can be adjusted dynamically under the high-performance mode, to achieve a balance between database performance and count accuracy.

Figure 5:
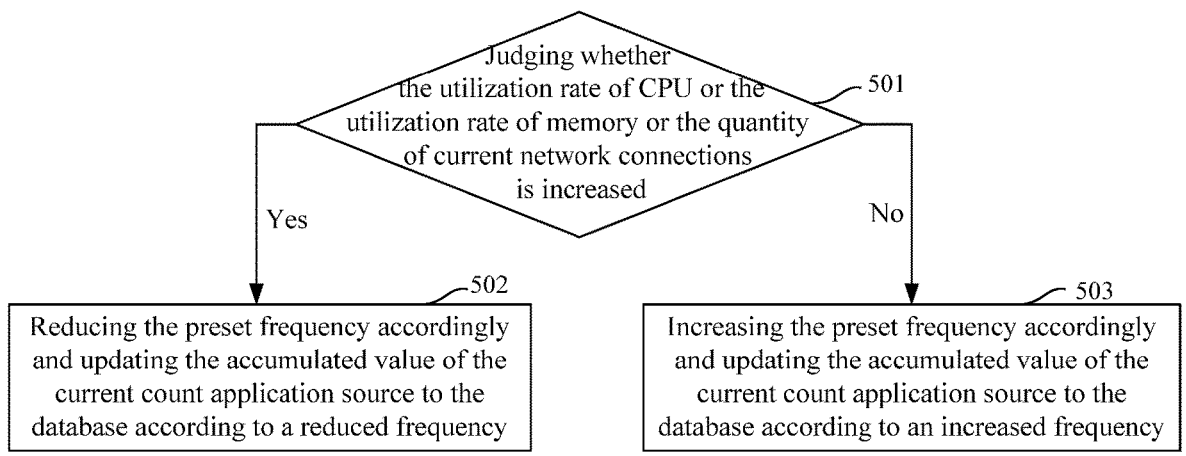
FIG. 5 is another schematic flow chart of sub-steps of a counting method in accordance with an embodiment of the present application.

In other embodiments, specifically, as shown in FIG. 5, S105 includes S501-S503. S501: judging whether the utilization rate of CPU or the utilization rate of memory or the quantity of current network connections is increased. Execute S502 if it is increased, otherwise execute S503. S502: reducing the preset frequency accordingly and updating the accumulated value of the current count application source to the database according to a reduced frequency. S503: increasing the preset frequency accordingly and updating the accumulated value of the current count application source to the database according to an increased frequency. Understandably, if the utilization rate of CPU or the utilization rate of memory or the quantity of current network connections is increased, it means that the workload of the server is increased, at this point, if the preset frequency is increased correspondingly, the workload of the server will be increased and the pressure on the server will be increased. Therefore, the preset frequency needs to be reduced correspondingly, that is, the frequency of the current count application source to update the database needs to be reduced correspondingly. Otherwise, the preset frequency needs to be increased correspondingly. According to the embodiment of the present invention, the frequency of updating database of the current count application source can be adjusted dynamically under the high-performance mode, that is, the interaction frequency between server and database can be adjusted dynamically, thereby improving the performance of server and database, and achieving a balance between database performance and count accuracy.

S106: updating the accumulated value of the current count application source to the database according to a preset frequency.

Figure 6:
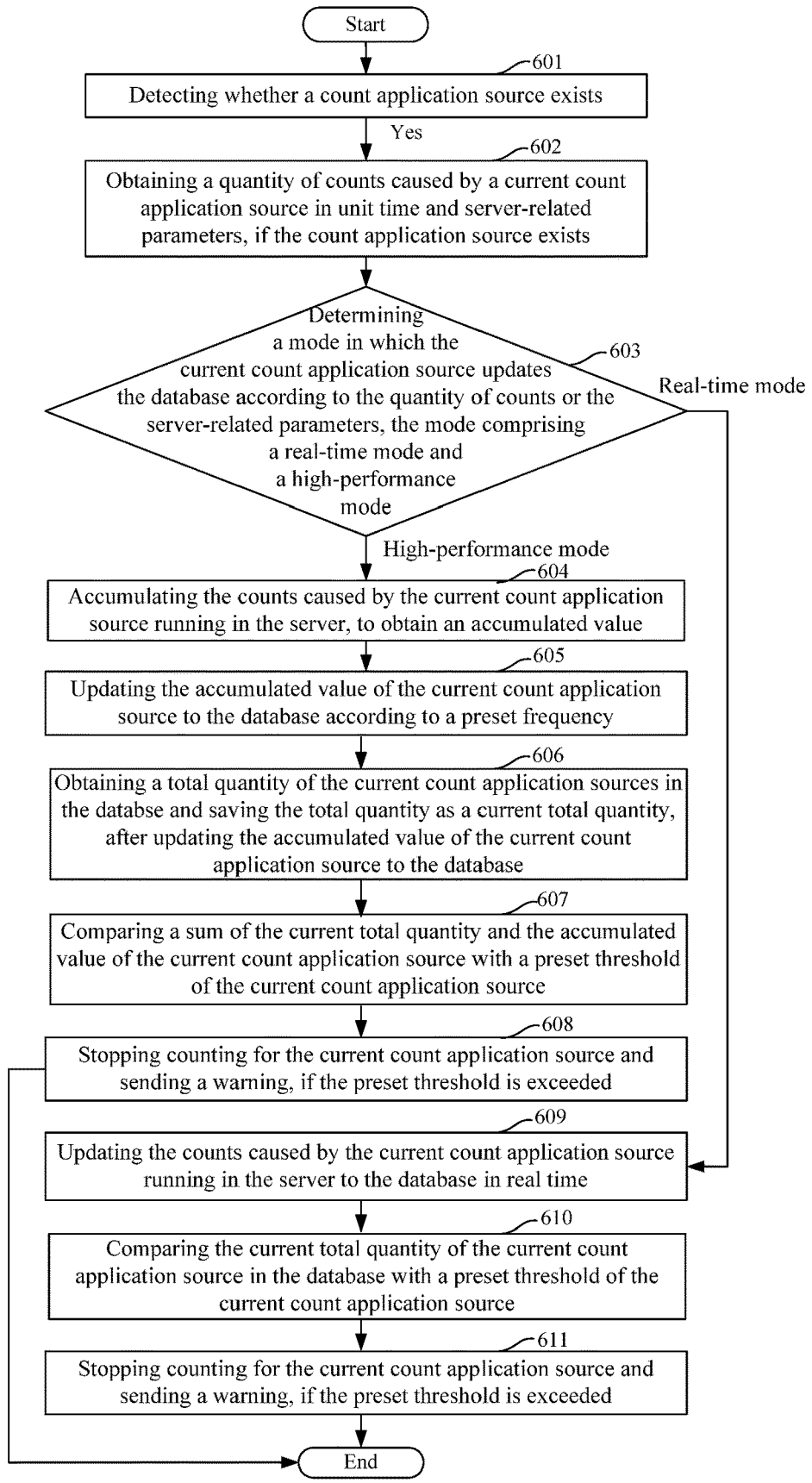
FIG. 6 is a schematic flow chart of a counting method in accordance with another embodiment of the present application.

FIG. 6 is a schematic flow chart of a counting method in accordance with another embodiment of the present application. The method includes the following step S601-S611.

S601: detecting whether a count application source exists. Specifically, a connection request can be used to detect whether a count application source exists. For example, detect whether the IP address of the connection request matches with the IP address of the pre-stored count application source and determine that the count application source is exists if it matches. Wherein, the connection request of the current count application source is sent to the server. The number of the current count application sources is at least one. Understandably, one or more count application sources could be detected.

S602: obtaining a quantity of counts caused by the current count application source in unit time and server-related parameters, if the count application source exists. Wherein, the server-related parameters include at least one of a utilization rate of CPU, a utilization rate of memory and a quantity of current network connections. The unit time is not just unit time, it also can be a period of time, such as one hour, etc.

S603: determining a mode in which the current count application source updates the database according to the quantity of counts in unit time or the server-related parameters, the mode including a real-time mode and a high-performance mode. Wherein, the high-performance mode is a non-real-time mode, that is, all other modes except of the real-time mode. Execute S604 if it is the high-performance mode and execute S609 if it is the real-time mode. Wherein, please referring to FIG. 2, it shows a step of determining a mode in which the current count application source updates the database according to the quantity of counts in unit time, and please referring to FIG. 3, it shows a step of determining a mode in which the current count application source updates the database according to the server-related parameters.

S604: accumulating counts caused by the current count application source running in the server, to obtain an accumulated value. Specifically, the accumulated value can be obtained by accumulating the counts caused by the current count application source running in the server over a period of time. In this case, the accumulated value will be cleared.

S605: updating the accumulated value of the current count application source to the database according to a preset frequency. Wherein, if the accumulated value is obtained by accumulating the counts caused by running over a period of time (the time corresponding to the preset frequency), the accumulated value of the count application source will be incremented to the database, and then the accumulated value will be cleared to zero. The preset frequency is related to the quantity of counts of the current count application source in unit time or the server-related parameters. Preferably, the initial value of the preset frequency is 1 minute. Specifically, please referring to the illustration of FIG. 4, it shows an embodiment of S605. In other embodiments, please referring to illustration of FIG. 5, it shows another embodiment of S605.

S606: obtaining a total quantity of the current count application sources in the database and saving the total quantity as a current total quantity, after updating the accumulated value of the current count application source to the database.

S607: comparing a sum of the current total quantity and the accumulated value of the current count application source with a preset threshold of the current count application source. Wherein, each count application source is provided with one threshold. Understandably, the number of times the server is invoked by other platform is limited, that is, the server cannot be called indefinitely. It can be used in a charging system. For example, if the current count application source pays 100 yuan, then the current count application source is allowed to call the server 100 times, if more than 100 times, then the server will not be allowed to be called, unless additional money is paid.

S608: stopping counting for the current count application source and sending a warning if the preset threshold is exceeded. If the quantity of counts of the current count application source has reached a predetermined threshold, the server will stop counting for the current count application source and sending a warning to alert the current count application source.

S609: updating the counts caused by the current count application source running in the server to the database in a real time. The counts caused by the current count application source running in the server will be updated to the database in real time. If the current count application source updates the database in real-time mode.

S610: comparing the current total quantity of the current count application source in the database with a preset threshold of the current count application source. If the current count application source updates the database in real-time mode, a threshold is predetermined for the current count application source, which indicates that the number of times the server is invoked by the current count application source is limited.

S611: stopping counting for the current count application source and sending a warning if the preset threshold is exceeded, so as to alert the current count application source.

In the embodiments of the method, it is implemented by comparing the current total quantity of the counts of the current count application source with the preset threshold of the current count application source and stopping counting for the current count application source and sending a warning if the preset threshold is exceeded. The current count application source is alerted by stopping counting for the current count application source and sending a warning.

Figure 7:
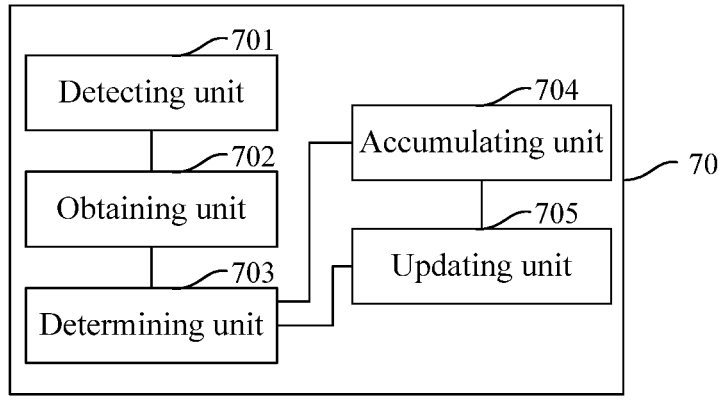
FIG. 7 is a schematic block diagram of a counter in accordance with an embodiment of the present application.

FIG. 7 is a schematic block diagram of a counter in accordance with an embodiment of the present application. The counter 70 includes a detecting unit 701, a obtaining unit 702, a determining unit 703, an accumulating unit 704 and an updating unit 705.

The detecting unit 701 is provided for detecting whether a count application source exists.

The obtaining unit 702 is provided for obtaining a quantity of counts caused by a current count application source in unit time and server-related parameters, if a count application source exists.

The determining unit 703 is provided for determining a mode in which the current count application source updates the database according to the quantity of counts in unit time or the server-related parameters, the mode including a real-time mode and a high-performance mode.

Figure 8:
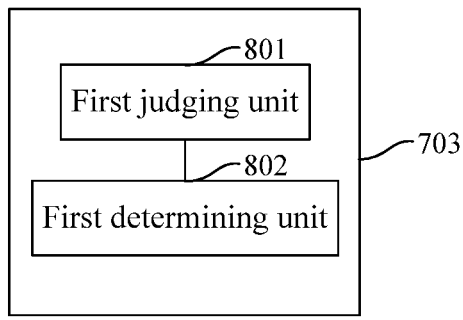
FIG. 8 is a schematic block diagram of a judging unit in accordance with an embodiment of the present application.

Preferably, the determining unit is provided for determining a mode in which the current count application source updates the database according to the quantity of counts in unit time. As shown in FIG. 8, the determining unit 703 includes a first judging unit 801 and a first determining unit 802. The first judging unit 801 is provided for judging whether the quantity of counts in unit time exceeds a preset quantity. The first determining unit 802 is provided for determining that the current count application source updates the database in the high-performance mode, if the quantity of counts in unit time exceeds a preset quantity. The first determining unit 803 is further provided for determining that the current count application source updates the database in the real-time mode, if the quantity of counts in unit time is less than or equal to the preset quantity.

Figure 9:
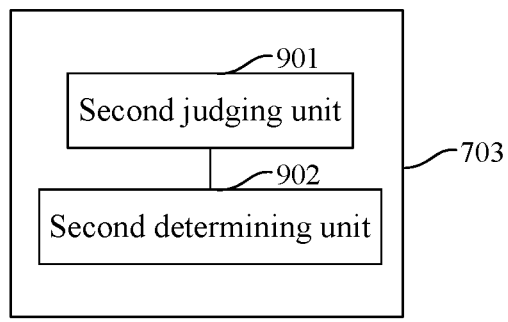
FIG. 9 is a schematic block diagram of another judging unit in accordance with an embodiment of the present application.

In other embodiments, the determining unit is provided for determining a mode in which the current count application source updates the database according to the server-related parameters. As shown in FIG. 9, the determining unit 703 includes a second judging unit 901 and a second determining unit 902. The second judging unit 901 is provided for judging whether the utilization rate of CPU is higher than a first preset utilization rate, or whether the utilization rate of memory is higher than a second preset utilization rate, or whether the quantity of current network connections is equal to a maximum quantity of network connections of the server. The second determining unit 902 is provided for determining that the current count application source updates the database in the high-performance mode, if the utilization rate of CPU is higher than a first preset utilization rate, or the utilization rate of memory is higher than a second preset utilization rate, or the quantity of current network connections is equal to a maximum quantity of network connections of the server. The second determining unit 902 is further provided for determining that the current count application source updates the database in the real-time mode, if a judgment result of the second judging unit 901 is no.

The accumulating unit 704 is provided for accumulating the counts caused by the current count application source running in the server to obtain an accumulated value, if the current count application source updates the database in the high-performance mode.

The updating unit 705 is provided for updating the accumulated value of the current count application source to the database according to a preset frequency.

Figure 10:
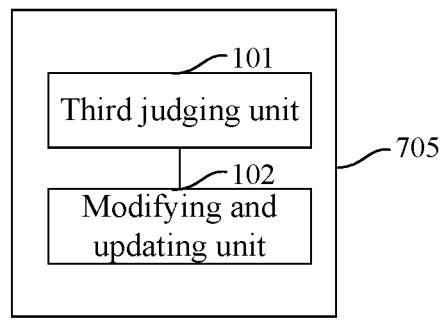
FIG. 10 is a schematic block diagram of an updating unit in accordance with an embodiment of the present application.

Specifically, as shown in FIG. 10, the updating unit 705 includes a third judging unit 101 and a modifying and updating unit 102. The third judging unit 101 is provided for judging whether the quantity of counts caused by the current count application source in unit time is reduced. The modifying and updating unit 102 is provided for reducing the preset frequency accordingly and updating the accumulated value of the current count application source to the database according to a reduced frequency, if the quantity of counts caused by the current count application source in unit time is reduced. The modifying and updating unit 102 is further provided for increasing the preset frequency accordingly and updating the accumulated value of the current count application source to the database according to an increased frequency, if the quantity of counts caused by the current count application source in unit time is increased.

The third judging unit 101 is further provided for judging whether the utilization rate of CPU or the utilization rate of memory or the quantity of current network connections is increased. The modifying and updating unit 102 is further provided for reducing the preset frequency accordingly and updating the accumulated value of the current count application source to the database according to a reduced frequency, if the utilization rate of CPU or the utilization rate of memory or the quantity of current network connections is increased. The modifying and updating unit 102 is further provided for increasing the preset frequency accordingly and updating the accumulated value of the current count application source to the database according to an increased frequency, if a judgment result of the third judging unit is no.

The updating unit 705 is further provided for updating the counts caused by the current count application source running in the server to the database in real time.

Figure 11:
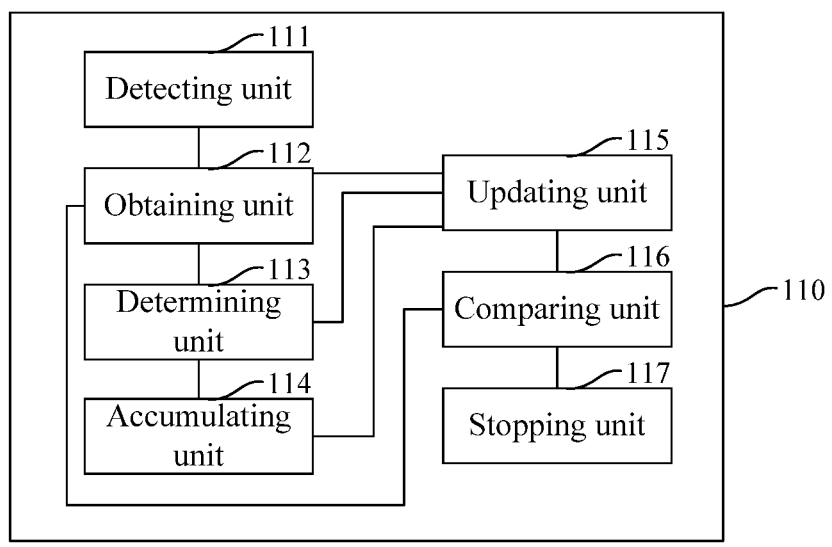
FIG. 11 is a schematic block diagram of a counter in accordance with another embodiment of the present application.

FIG. 11 is a schematic block diagram of a counter in accordance with another embodiment of the present application. The counter 110 includes a detecting unit 111, a obtaining unit 112, a determining unit 113, an accumulating unit 114, an updating unit 115, a comparing unit 116 and a stopping unit 117. Wherein, with respect to the detecting unit 111, the obtaining unit 112 and the determining unit 113, please refer to the description of the detecting unit 701, the obtaining unit 702 and the determining unit 703 in the foregoing embodiment.

The accumulating unit 114 is provided for accumulating the counts caused by the current count application source running in the server to obtain an accumulated value.

The updating unit 115 is provided for updating the accumulated value of the current count application source to the database according to a preset frequency.

The obtaining unit 112 is further provided for obtaining a total quantity of the current count application sources in the database and saving the total quantity as a current total quantity, after updating the accumulated value of the current count application source to the database.

The comparing unit 116 is provided for comparing a sum of the current total quantity and the accumulated value of the current count application source with a preset threshold of the current count application source, if the current count application source updates the database in the high-performance mode. The comparing unit 116 is further provided for comparing the current total quantity of the current count application source in the database with a preset threshold of the current count application source, if the current count application source updates the database in the real-time mode.

The stopping unit 117 is provided for stopping counting for the current count application source, if the sum of the current total quantity and the accumulated value of the current count application source exceeds the preset threshold, when the count application source updates the database in high-performance mode. The stopping unit 117 is further provided for stopping counting for the current count application source, if the current total quantity of the current count application source exceeds the preset threshold when the count application source updates the database in real-time mode.

For the specific working process of the above described counter and unit, reference may be made to the corresponding process in the foregoing embodiments of the method, and the beneficial effects achieved may also be referred to the beneficial effects achieved in the foregoing embodiments of the method, and details are not described herein again.

Figure 12:
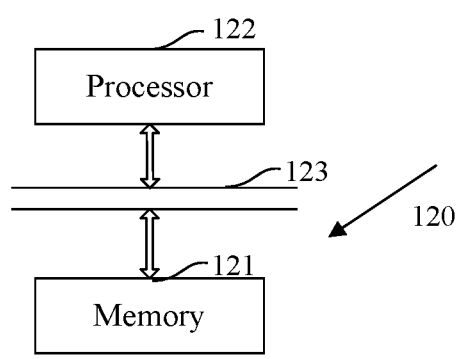
FIG. 12 is a schematic block diagram of a counter in accordance with another embodiment of the present application.

The counter described above can be implemented as a form of computer program data that can run on the counter shown in FIG. 12.

FIG. 12 is a schematic block diagram of a counter in accordance with another embodiment of the present application. The counter 120 includes a memory 121 and a processor 122, and such memory 121 and processor 122 are connected through a bus 123.

The memory 121 is provided for storing programs and data of different functions. In an embodiment of the present application, the data stored in the memory 121 includes the preset frequency, the first preset utilization rate, the second preset utilization rate, the maximum quantity of network connections of the server, the preset quantity, the utilization rate of CPU, the utilization rate of memory, the quantity of current network connections, the quantity of counts in unit time and so on, and any other callable and operable programs and data. In an embodiment of the present application, the memory 121 could be a system memory such as a nonvolatile memory (ROM, flash memory, etc.). In a specific embodiment of the present application, the memory 121 could be an external memory such as a disk, an optical disk, a magnetic tape, etc. The memory 121 provides an environment for operation of the program data, and when the program data is executed by the processor 122, the processor 122 could be caused to perform any embodiment of the above counting method.

The processor 122 is provided for calling the program and data stored in the memory 121 and executing the embodiments of the above counting method.

The present invention further provides a computer-readable storage medium, which is provided for storing one or more programs, wherein the one or more programs could be executed by one or more processors, so as to perform anyone of the embodiments of the above counting method.

The computer-readable storage medium could be an internal storage unit of a device, such as a hard disk or memory of the device. The computer-readable storage medium also could be an external storage device, such as a plug-in hard disk, Smart Media Card (SMC), Secure Digital (SD) Card, etc. Furthermore, the computer-readable storage medium may also include both the internal storage unit and external storage device of the device.

For simplicity and clarification, people having ordinary skill in the art should be able to refer to the corresponding operations and procedures of the method as described above for the operating procedures of the aforementioned embodiments of the method, and thus they will not be repeated. The present application is illustrated by several embodiments, but the disclosed counter and method could be implemented by other methods. The embodiments of the aforementioned counter are provided for the illustrative purpose. The division of units is simply a division by logical functions, and the units used in actual implementations may be divided by other ways. While the disclosure has been described by means of specific embodiments, numerous modifications and variations could be made thereto by those skilled in the art without departing from the scope and spirit of the disclosure set forth in the claims. Therefore, the protection scope of this application shall be subject to the protection scope of the claim.

What is claimed is:

1. A method for updating database counting, comprising:
    detecting whether a count application source exists, the count application source running in a server to generate counts, when the server is invoked by the count application source;
    obtaining a quantity of counts caused by a current count application source in unit time and server-related parameters, if the count application source exists, the server-related parameters comprising at least one of a utilization rate of CPU, a utilization rate of memory and a quantity of current network connections;
    determining a mode in which the current count application source updates the database according to the quantity of counts or the server-related parameters, the mode comprising a real-time mode and a high-performance mode;

accumulating the counts caused by the current count application source running in the server, to obtain an accumulated value, if the current count application source updates the database in the high-performance mode; and updating the accumulated value of the current count application source to the database according to a preset frequency.

2. The method of claim 1, wherein, the method further comprises:

obtaining a total quantity of the current count application sources in the database and saving the total quantity as a current total quantity, after updating the accumulated value of the current count application source to the database;

comparing a sum of the current total quantity and the accumulated value of the current count application source with a preset threshold of the current count application source; and stopping counting for the current count application source if the preset threshold is exceeded.

3. The method of claim 1, wherein the step of determining a mode in which the current count application source updates the database according to the quantity of counts comprises the steps of:

judging whether the quantity of counts exceeds a preset quantity;

determining that the current count application source updates the database in the high-performance mode, if the preset quantity is exceeded; and determining that the current count application source updates the database in the real-time mode, if the quantity of counts is less than or equal to the preset quantity.

4. The method of claim 1, wherein the step of determining a mode in which the current count application source updates the database according to the server-related parameters comprises the steps of:

judging whether the utilization rate of CPU is higher than a first preset utilization rate, or whether the utilization rate of memory is higher than a second preset utilization rate, or whether the quantity of current network connections is equal to a maximum quantity of network connections of the server;

determining that the current count application source updates the database in the high-performance mode, if a judgment result is yes; and determining that the current count application source updates the database in the real-time mode, if a judgment result is no.

5. The method of claim 1, wherein the step of updating the accumulated value of the current count application source to the database according to a preset frequency comprises the steps of:

judging whether the quantity of counts caused by the current count application source in unit time is reduced;

reducing the preset frequency accordingly and updating the accumulated value of the current count application source to the database according to a reduced frequency, if a judgment result is yes;

increasing the preset frequency accordingly and updating the accumulated value of the current count application source to the database according to an increased frequency, if a judgment result is no; or judging whether the utilization rate of CPU or the utilization rate of memory or the quantity of current network connections is increased;

reducing the preset frequency accordingly and updating the accumulated value of the current count application source to the database according to a reduced frequency, if a judgment result is yes;

increasing the preset frequency accordingly and updating the accumulated value of the current count application source to the database according to an increased frequency, if a judgment result is no.

6. A counter, comprising a memory and a processor coupled to the memory; wherein the memory is provided for storing program data; and the processor is provided for calling the program data stored in the memory so as to execute a method for updating database counting comprising the steps of:

detecting whether a count application source exists, the count application source running in a server to generate counts, when the server is invoked by the count application source;

obtaining a quantity of counts caused by a current count application source in unit time and server-related parameters, if a count application source exists, the server-related parameters comprising at least one of a utilization rate of CPU, a utilization rate of memory and a quantity of current network connections;

determining a mode in which the current count application source updates the database according to the quantity of counts or the server-related parameters, the mode comprising a real-time mode and a high-performance mode;

accumulating the counts caused by the current count application source running in the server to obtain an accumulated value, if the current count application source updates the database in the high-performance mode; and updating the accumulated value of the current count application source to the database according to a preset frequency.

7. The counter of claim 6, wherein the processor further executes the steps of:

obtaining a total quantity of the current count application sources in the database and saving the total quantity as a current total quantity, after updating the accumulated value of the current count application source to the database;

comparing a sum of the current total quantity and the accumulated value of the current count application source with a preset threshold of the current count application source; and stopping counting for the current count application source if the preset threshold is exceeded.

8. The counter of claim 6, wherein when executing the step of determining a mode in which the current count application source updates the database according to the quantity of counts, the processor executes the step of:

judging whether the quantity of counts exceeds a preset quantity;

determining that the current count application source updates the database in the high-performance mode, if the preset quantity is exceeded; and determining that the current count application source updates the database in the real-time mode, if the quantity of counts is less than or equal to the preset quantity.

9. The counter of claim 6, wherein when executing the step of determining a mode in which the current count application source updates the database according to the server-related parameters, the processor executes the step of:
judging whether the utilization rate of CPU is higher than a first preset utilization rate, or whether the utilization rate of memory is higher than a second preset utilization rate, or whether the quantity of current network connections is equal to a maximum quantity of network connections of the server;
determining that the current count application source updates the database in the high-performance mode, if a judgment result is yes; and
determining that the current count application source updates the database in the real-time mode, if a judgment result is no.

10. The counter of claim 6, wherein when executing the step of updating the accumulated value of the current count application source to the database according to a preset frequency, the processor executes the steps of: judging whether the quantity of counts of the current count application source in unit time is reduced;
reducing the preset frequency accordingly and updating the accumulated value of the current count application source to the database according to a reduced frequency, if a judgment result is yes;
increasing the preset frequency accordingly and updating the accumulated value of the current count application source to the database according to an increased frequency, if a judgment result is no; or
judging whether the utilization rate of CPU or the utilization rate of memory or the quantity of current network connections is increased;
reducing the preset frequency accordingly and updating the accumulated value of the current count application source to the database according to a reduced frequency, if a judgment result is yes;
increasing the preset frequency accordingly and updating the accumulated value of the current count application source to the database according to an increased frequency, if a judgment result is no.

11. A non-transitory computer-readable storage medium, provided for storing one or more programs, wherein the one or more programs is executed by one or more processors, so as to perform a method for updating database counting comprising the steps of:
detecting whether a count application source exists, the count application source running in a server to generate counts, when the server is invoked by the count application source;
obtaining a quantity of counts caused by a current count application source in unit time and server-related parameters, if a count application source exists, the server-related parameters comprising at least one of a utilization rate of CPU, a utilization rate of memory and a quantity of current network connections;
determining a mode in which the current count application source updates the database according to the quantity of counts or the server-related parameters, the mode comprising a real-time mode and a high-performance mode;
accumulating the counts caused by the current count application source running in the server to obtain an accumulated value, if the current count application source updates the database in the high-performance mode; and
updating the accumulated value of the current count application source to the database according to a preset frequency.

12. The non-transitory computer-readable storage medium of claim 11, wherein the step further comprises the steps of: obtaining a total quantity of the current count application sources in the database and saving the total quantity as a current total quantity, after updating the accumulated value of the current count application source to the database;
comparing a sum of the current total quantity and the accumulated value of the current count application source with a preset threshold of the current count application source; and
stopping counting for the current count application source if the preset threshold is exceeded.

13. The non-transitory computer-readable storage medium of claim 11, wherein when executing the step of determining a mode in which the current count application source updates the database according to the quantity of counts, the processor performs the step of:
judging whether the quantity of counts exceeds a preset quantity;
determining that the current count application source updates the database in the high-performance mode, if the preset quantity is exceeded; and
determining that the current count application source updates the database in the real-time mode, if the quantity of counts is less than or equal to the preset quantity.

14. The non-transitory computer-readable storage medium of claim 11, wherein when executing the step of determining a mode in which the current count application source updates the database according to the server-related parameters, the processor performs the step of:
judging whether the utilization rate of CPU is higher than a first preset utilization rate, or whether the utilization rate of memory is higher than a second preset utilization rate, or whether the quantity of current network connections is equal to a maximum quantity of network connections of the server;
determining that the current count application source updates the database in the high-performance mode, if a judgment result is yes; and
determining that the current count application source updates the database in the real-time mode, if a judgment result is no.

15. The non-transitory computer-readable storage medium of claim 11, wherein when executing the step of updating the accumulated value of the current count application source to the database according to a preset frequency, the processor executes the steps of: judging whether the quantity of counts of the current count application source in unit time is reduced;
reducing the preset frequency accordingly and updating the accumulated value of the current count application source to the database according to a reduced frequency, if a judgment result is yes;
increasing the preset frequency accordingly and updating the accumulated value of the current count application source to the database according to an increased frequency, if a judgment result is no; or
judging whether the utilization rate of CPU or the utilization rate of memory or the quantity of current network connections is increased;
reducing the preset frequency accordingly and updating the accumulated value of the current count application source to the database according to a reduced frequency, if a judgment result is yes;

increasing the preset frequency accordingly and updating the accumulated value of the current count application source to the database according to an increased frequency, if a judgment result is no.

\* \* \* \* \*